United States Patent
Nguyen et al.

(10) Patent No.: US 8,399,386 B2
(45) Date of Patent: Mar. 19, 2013

(54) FOAMERS FOR DOWNHOLE INJECTION

(75) Inventors: Duy T. Nguyen, Houston, TX (US); G. Richard Meyer, Missouri City, TX (US)

(73) Assignee: Nalco Company, Naperville, IL (US)

( * ) Notice: Subject to any disclaimer, the term of this patent is extended or adjusted under 35 U.S.C. 154(b) by 79 days.

(21) Appl. No.: 12/565,433

(22) Filed: Sep. 23, 2009

(65) Prior Publication Data
US 2011/0071059 A1   Mar. 24, 2011

(51) Int. Cl.
*C23F 11/14* (2006.01)
*E21B 43/26* (2006.01)
*E21B 43/00* (2006.01)

(52) U.S. Cl. ............... 507/243; 166/308.6; 166/309

(58) Field of Classification Search .......... 507/90, 507/243, 939; 166/308.6, 309
See application file for complete search history.

(56) References Cited

U.S. PATENT DOCUMENTS

| | | | |
|---|---|---|---|
| 2,731,414 A * | 1/1956 | Binder, Jr. et al. | 166/400 |
| 3,330,346 A | 7/1967 | Jacobs et al. | |
| 3,720,498 A * | 3/1973 | Redmore | 422/7 |
| 4,778,589 A | 10/1988 | Reynolds | |
| 5,300,235 A * | 4/1994 | Clewlow et al. | 507/243 |
| 5,512,212 A * | 4/1996 | Brown et al. | 252/387 |
| 5,871,048 A | 2/1999 | Tokar et al. | |
| 6,143,709 A | 11/2000 | Carey | |
| 6,488,868 B1 * | 12/2002 | Meyer | 252/394 |
| 6,630,428 B1 | 10/2003 | Furman et al. | |
| 7,093,658 B2 | 8/2006 | Chatterji et al. | |
| 7,122,509 B2 | 10/2006 | Sanner et al. | |
| 7,204,311 B2 | 4/2007 | Welton et al. | |
| 7,497,943 B2 | 3/2009 | Nguyen et al. | |
| 7,971,659 B2 | 7/2011 | Gatlin et al. | |
| 7,992,653 B2 | 8/2011 | Zamora et al. | |
| 2001/0009890 A1 | 7/2001 | Patel et al. | |
| 2004/0110643 A1 | 6/2004 | Zevallos | |
| 2004/0177968 A1 | 9/2004 | Ramachandran | |
| 2005/0137114 A1 | 6/2005 | Gatlin et al. | |
| 2006/0128990 A1 | 6/2006 | Davis et al. | |
| 2007/0079963 A1 | 4/2007 | Yang et al. | |
| 2008/0200351 A1 | 8/2008 | Dahanayake et al. | |
| 2009/0131283 A1 | 5/2009 | Nguyen et al. | |

FOREIGN PATENT DOCUMENTS

| | | |
|---|---|---|
| EP | 0631605 | 4/1999 |
| WO | 02/092963 | 11/2002 |
| WO | 2004/020553 | 3/2004 |

* cited by examiner

*Primary Examiner* — Ling Choi
*Assistant Examiner* — Aiqun Li
(74) *Attorney, Agent, or Firm* — Edward O. Yonter; Andrew D. Sorensen

(57) ABSTRACT

The present invention relates to a method for introducing a foaming composition including an imidazoline-based compound to a fluid. The foaming composition comprises at least one quaternized compound having an imidazoline moiety. An example of the quaternized compound is a quaternized imidazoline.

15 Claims, No Drawings

FOAMERS FOR DOWNHOLE INJECTION

TECHNICAL FIELD

This invention relates generally to methods of using foamer compositions for treatment of oil and gas wells to enhance production. More specifically, the invention relates to foamer compositions including an imidazoline-based compound. The invention has particular relevance to such compositions that also include corrosion-reducing properties.

BACKGROUND

Declining reservoir pressure in natural gas wells may lead to gas production decreases. The typical cause of this decrease is liquid loading that occurs when water and condensate enter the bottom of the well. Foaming agents (sometimes referred to as "foamers") are frequently used to aid in the unloading of water and condensate accumulated in the wellbore, thereby increasing production from a loaded well. Such agents are generally applied either by batch treatments or continuous applications via injecting down a capillary string or via the casing/tubing annulus. Foamers function by reducing the surface tension and fluid density in the wellbore, and may also be used in conjunction with a lift gas to enhance oil recovery from oil wells.

U.S. Pat. App. Pub. No. 2006/0128990 teaches a method of treating a gas well comprising a chloride-free amphoteric surfactant. U.S. Pat. No. 7,122,509 discloses a method of preparing a foamer composition having an anionic surfactant and a neutralizing amine. In U.S. Pat. App. Pub. 2005/0137114 an aqueous foaming composition comprising an anionic surfactant, a cationic surfactant, and a zwitterionic compound is disclosed. PCT App. Pub. No. WO 02/092963 and U.S. Pat. App. Pub. No. 2007/0079963 disclose methods for recovering oil from a gas-lifted oil well using a lift gas and a foaming surfactant which consists of nonionic surfactants, anionic surfactants, betaines, and siloxanes.

While such foamers represent a significant contribution to the art of unloading fluids in oil and gas wells, there still remains a need for improved foamers and methods of using improved foamers. It is thus an objective of this invention to provide a cost-effective foamer for unloading oil, water, or mixtures thereof from oil and/or gas wells. Such improved foamers would also ideally be compatible with anti-corrosive and anti-scale agents.

SUMMARY

This invention provides a method of foaming a fluid. The method includes introducing into the fluid a foam-forming amount of a composition comprising at least one imidazoline-based compound of the general formula:

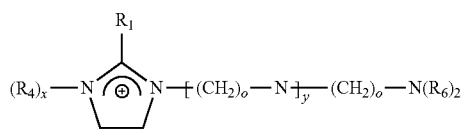

wherein $R_4$ has the following structure:

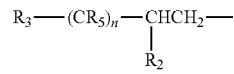

In a preferred aspect, the variables of the above general formula are defined as follows: (i) $R_1$ is a moiety selected from the group consisting of: substituted or unsubstituted branched, chain, or ring alkyl or alkenyl having from 5 to about 29 carbon atoms in its main chain; (ii) each $R_2$ is independently hydrogen or a linear alkyl or alkenyl moiety having from 1 to about 10 carbon atoms; (iii) each $R_3$ is independently a moiety selected from the group consisting of —$CO_2H$, —$SO_3H$, —$PO_3H_2$, —$CO_2R_5$, —$CONH_2$, —$CONHR_5$, —$CON(R_5)_2$, and combinations thereof; (iv) at least one $R_6$ is $R_4$, and the other $R_6$ is H or $R_4$; (v) each $R_5$ is independently a moiety selected from the group consisting of hydrogen, substituted and unsubstituted linear alkyl, branched alkyl, aryl, alkylaryl, cycloalkyl, and heteroaromatic groups having from 1 to about 10 carbon atoms in the main chain; (vi) n is from 0 to about 8; (vii) each o is independently from 0 to about 10; (viii) x is 0 or 1; and (ix) y is from 0 to about 4.

In another aspect, the imidazoline-based compound is formed from a reaction between at least one long chain fatty acid and at least one polyalkylene polyamine. The intermediate imidazoline produced by this reaction is then further reacted with at least one unsaturated acid or acid derivative to form the imidazoline-based compound.

It is an advantage of the invention to provide novel foaming agents for downhole injection in oil and gas wells.

It is another advantage of the invention to provide dual-purpose foaming agents having both foaming properties and anti-corrosive properties.

It is a further advantage of the invention to provide an efficient method of recovering oil from a gas-lifted oil well penetrating a subterranean oil-bearing formation.

It is yet another advantage of the invention to provide a chloride-free foamer efficient at removing fluids from oil and gas wells.

A further advantage of the invention is to provide an efficient method to remove hydrocarbon fluids from a gas-producing well.

Additional features and advantages are described herein, and will be apparent from, the following Detailed Description and Examples

DETAILED DESCRIPTION

The following definitions and any other definitions herein provided are meant to be clarifying and are not intended to be limiting.

"Alkenyl" means a monovalent group derived from a straight, branched, or cyclic hydrocarbon containing at least one carbon-carbon double bond by the removal of a single hydrogen atom from each of two adjacent carbon atoms of an alkyl group. Representative alkenyl groups include, for example, ethenyl, propenyl, butenyl, 1-methyl-2-buten-1-yl, and the like.

"Alkoxy" means an alkyl group attached to the parent molecular moiety through an oxygen atom. Representative alkoxy groups include methoxy, ethoxy, propoxy, butoxy, and the like.

"Alkyl" means a monovalent group derived from a straight, branched, or cyclic saturated hydrocarbon. Representative alkyl groups include methyl, ethyl, n- and iso-propyl, n-, sec-, iso- and tert-butyl, and the like.

"Aminoalkyl" refers to an alkyl group having one or more amino substitutions or an amino group having multiple alkyl substitutions. Representative aminoalkyls include aminomethyl, dimethylaminomethyl, diethylaminomethyl, 2-aminoethyl, 2-dimethylaminoethyl, 2-ethylaminoethyl, and the like.

"Aryl" means substituted and unsubstituted aromatic carbocyclic radicals and substituted and unsubstituted heterocyclic radicals having about 5 to about 14 ring atoms. Representative aryls include phenyl, naphthyl, phenanthryl, anthracyl, pyridyl, furyl, pyrrolyl, quinolyl, thienyl, thiazolyl, pyrimidyl, indolyl, and the like. The aryl is optionally substituted with one or more groups selected from hydroxy, halogen, C1 to C4 alkyl and C1 to C4 alkoxy.

"Arylalkyl" means an aryl group attached to the parent molecular moiety through an alkylene group. Representative arylalkyl groups include benzyl, phenethyl, napth-1-ylmethyl, phenylpropyl, and the like "Unsaturated acid" refers to any α,β unsaturated organic acid compound having from about 3 to about 18 carbon atoms, salts thereof, derivatives thereof, and combinations thereof. For example, such acids or acid derivatives may contain moieties including the following: —$CO_2H$, —$SO_3H$, —$PO_3H_2$, —$CO_2R_5$, —$CONH_2$, —$CONHR_5$, and —$CON(R_5)_2$, where $R_5$ is as defined herein.

The foaming compositions of this invention have been shown to be effective for recovering natural gas from a gas well and recovering crude oil from a gas-lifted oil well penetrating a subterranean oil-bearing formation. That is, the foaming agents of the present invention effectively remove hydrocarbon and/or water or mixtures thereof from the wells. The effective amount of active ingredient in a formulation required to sufficiently foam varies with the system in which it is used. Methods for monitoring foaming rates in different systems are well known to those skilled in the art and may be used to decide the effective amount of active ingredient required in a particular situation. The described compounds may be used to impart the property of foaming to a composition for use in an oil or gas field application.

The foamers of the invention can be applied by batch treatments or continuous applications via the casing/tubing annulus or via capillary strings and are typically applied to the downhole end of a well. A batch treatment involves the application of a single volume of foamer to the well, as opposed to a smaller volume applied continuously for the case of a continuous application. The next batch is applied after a period of time when the foamer starts to lose its effectiveness.

The described foaming compositions are particularly effective for unloading fluids (oil and/or water) from oil and gas wells under a variety of conditions. These compounds/compositions may be used in wells in which oil cuts in the field can range from about 0% (oil field) to 100% (refinery) oil, while the nature of the water can range from 0 to 300,000 ppm TDS (total dissolved solids). In addition, the downhole temperature can be between 60° F. and 400° F. In a preferred method, the described foamers can be applied by batch treatments or continuously via the casing/tubing annulus or via capillary strings. Batch treatment typically involves the application of a single volume of foamer to the well, where a subsequent batch is applied when the foamer begins to lose its effectiveness. In a typical continuous application, in contrast, a smaller volume is applied continuously.

Even though this disclosure is directed primarily to oil and gas applications, it is contemplated that the compounds of the invention may be used in a variety of applications. Representative applications include flotation deinker for paper applications to remove ink particles and other contaminants and in mining as a flotation aid to extract minerals. Foamers are generally added to fluids and mixtures to reduce surface tension. As air is blown through the fluid, for example, mineral particles or ink particles attach to the air bubbles and rise to form a froth on the fluid (usually water) surface. The froth is typically skimmed off, thus leaving a cleaned concentrate.

The preparation of imidazolines is well known in the art. A general formula for the imidazoline-based foamer of this invention is shown below.

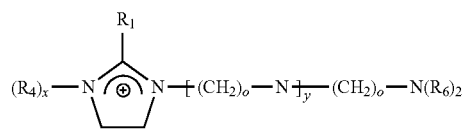

wherein $R_4$ has the following structure:

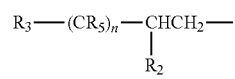

In an embodiment, $R_1$ is a moiety that is substituted or unsubstituted branched, chain, or ring alkyl or alkenyl having from 1 to about 25 carbon atoms, from about 5 to about 29 carbon atoms, or from about 7 to about 23 carbon atoms in its main chain. It should be understood that the range of carbon atoms described for $R_1$ refers to the main chain of the group and does not include carbon atoms contributed by substituents. Examples of suitable substituents include, without limitation, hydrogen and linear or branched alkyl, aryl, alkylaryl, cycloalkyl, and heteroaromatic groups having from 1 to about 10 carbon atoms, and their combinations. In an embodiment, the branched, chain, or ring alkyl or alkenyls are oxygenized, sulfurized, phosphorylized, or combinations thereof.

In an embodiment, each $R_2$ is independently hydrogen or a linear alkyl or alkenyl moiety having from 1 to about 10 carbon atoms.

In an embodiment, each $R_3$ is independently a moiety selected from the following: —$CO_2H$, —$SO_3H$, —$PO_3H_2$, —$CO_2R_5$, —$CONH_2$, —$CONHR_5$, —$CON(R_5)_2$, and combinations thereof.

In an embodiment, at least one $R_6$ is $R_4$, and the other $R_6$ is H or $R_4$.

In an embodiment, each $R_5$ is independently a moiety selected from the following: hydrogen and substituted and unsubstituted linear alkyl, branched alkyl, aryl, alkylaryl, cycloalkyl, and heteroaromatic groups having from 1 to about 10 carbon atoms in the main chain.

In an embodiment, n is from 0 to about 8 and each o is independently from 0 to about 10.

In an embodiment, x is 0 or 1 and y is from 0 to about 4.

In another embodiment, each $R_4$ is independently a polyalkylene polyamine group. Preferably, the polyalkylene polyamine moiety of the invention has from about 2 to about 16 carbon atoms. Generally preferred polyalkylene polyamine moieties have the following general formula below where m is from 0 to about 4. In a preferred embodiment, an alkyl of 1 to 10 carbon atoms links this moiety to the imidazoline base. Preferably m is from 0 to about 2. Representative polyethylene polyamines include diethylenetriamine, (DETA), triethylenetetraamine (TETA), tetraethylenepentamine (TEPA), pentaethylenehexamine (PEHA), hexaethylenepentamine (HEPA), the like, and combinations thereof.

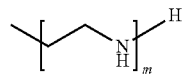

In one exemplary embodiment, the imidazoline-based foamers of the invention may be formed via reaction between a long chain fatty acid with a polyalkylene polyamine to form an imidazoline, followed by reaction with an unsaturated acid or acid derivative.

"Long chain fatty acid" refers to fatty acids of the type $R_1CO_2H$. Representative long chain fatty acids include caprylic acid; nonanoic acid; capric acid; undecanoic acid; lauric acid; tridecanoic acid; myristic acid; palmitoleic acid; tall oil fatty acid ("TOFA"), such a mixture of oleic, linoleic and linolenic acids; stearic acid; palmitic acid; arachidic acid; arachidonic acid; oleic acid; 9,11,13-octadecatrienoic acid; 5,8,11,14-eicosatetraenoic acid; eicosenoic acid; erucic acid; behenic acid; 3-methylhexadecanoic acid; 7-methylhexadecanoic acid; 13-methylhexadecanoic acid; 14-methyl-11-eicosenoic acid; the like; and mixtures thereof.

The preferred long chain fatty acid is TOFA, which in an embodiment refers to a distilled product derived from trees and which consists of a mixture of fatty acids, $C_{17}H_{31-35}CO_2H$ with a CAS No. 61790-12-3. It is a mixture of oleic acid as a major component, linoleic acid and saturated fatty acids. For purposes of this invention the radical obtained therefrom will be identified as heptadecenyl. In another embodiment, TOFA refers to tall oil fatty acid stock and typically includes about 1% palmitic acid; about 2% stearic acid; about 48% oleic acid; about 35% linoleic acid; about 7% conjugated linoleic acid ($CH_3(CH_2)_xCH=CHCH=CH(CH_2)_yCOOH$, where x is generally 4 or 5, y is usually 7 or 8, and X+Y is 12); about 4% other acids, such as 5,9,12-octadecatrienoic acid, linolenic acid, 5,11,14-eicosatrenoic acid, cis,cis-5,9-octadecadienoic acid, eicosadienoic acid, elaidic acid, cis-11 octadecanoic acid, and C-20, C-22, C-24 saturated acids; and about 2% unsaponifiable matter. In other embodiments, TOFA includes any suitable tall oil fatty acid or mixture known in the art or equivalents thereof.

Unsaturated acids or acid derivatives include, for example, $\alpha,\beta$ unsaturated organic acids. In a particularly preferred embodiment, the $\alpha,\beta$ unsaturated organic acid or acid derivative may be selected from the group consisting of substituted and unsubstituted $\alpha,\beta$ unsaturated carboxylic fatty acids and amide and ester derivatives thereof, having from about 3 to about 11 and up to about 8 to 18 carbon atoms, or a salt thereof; substituted and unsubstituted $\alpha$, $\beta$ unsaturated fatty acids having from about 3 to about 11 and up to about 8 to 18 carbon atoms, or a salt thereof; and combinations thereof.

More specifically, $\alpha,\beta$ unsaturated organic acids or acid derivatives typically have from about 3 to about 9 or up to about 8 to 18 carbon atoms. In a more preferred embodiment, the $\alpha,\beta$ unsaturated organic acids or acid derivatives have from about 3 to about 7 carbon atoms or 8 to 18 carbon atoms. The most preferred form of the $\alpha,\beta$ unsaturated organic acids or acid derivatives of the invention have from about 3 to about 5 carbon atoms or from about 8 to 18 carbon atoms. It should be understood that the range of carbon atoms described refers to the main chain of the fatty acid and does not include carbon atoms contributed by substituents. Examples of suitable substituents include, without limitation, hydrogen and linear or branched alkyl, aryl, alkylaryl, cycloalkyl, and heteroaromatic groups having from 1 to about 10 carbon atoms, and their combinations.

Representative $\alpha,\beta$ unsaturated organic acids include acrylic acid, vinyl sulfonic acid, 2-methyl vinyl sulfonic acid, maleic acid, the like, and combinations thereof.

A typical reaction scheme to produce the foaming agent of the invention is as follows. The resulting imidazoline is further reacted with one or more of the disclosed types of acids or acid derivatives to form a mixture of mono-, di-, and tri-substituted product (as illustrated in the embodiments in the examples herein).

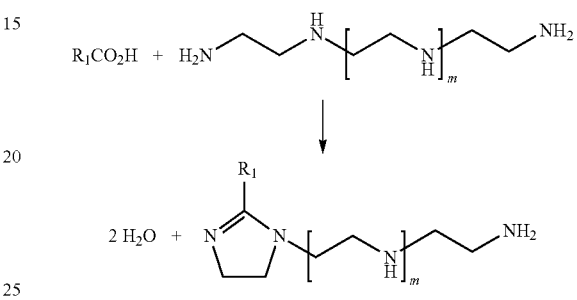

Foaming agents of this invention are typically made in a mixed solvent system that may contain water, xylene, alcohols, glycols, glycol ethers, the like, and combinations thereof. The use of a solvent increases the liquid unloading efficiency, reduces the viscosity, lowers the freezing point of the foamer and improves mixing between various components. Michael Addition is the reaction between the imidazoline-based compound and the carbonyl compound (e.g., unsaturated acid). The addition of this chemical moiety to the structure of the molecule increases its water solubility, enabling it to adsorb at the air bubble interface and increasing its foamability. It is also tolerant to high water salt content. In an embodiment, the present invention is normally diluted with water, alcohol, and/or glycol ether prior to application.

Additional examples of suitable solvents for the mixed solvent system are alcohols such as methanol, ethanol, isopropanol, isobutanol, secondary butanol, glycols (e.g., ethylene glycol, propylene glycol, ethylene glycol monobutyl ether, and the like), aliphatic and aromatic hydrocarbons, the like, and combinations thereof. In some embodiments, the described compounds are sparingly or fully water-soluble and as such compositions may be suitably formulated in a mixture of water and one or more alcohols or glycols. Similarly, the described compounds may be suitably formulated in an aromatic naptha, such as heavy aromatic naptha, by incorporating one or more alcohols or glycols in the composition.

The described imidazoline-based compounds foamers or foaming agents of this invention have been shown to be effective for penetrating subterranean oil-bearing or gas-bearing formations to recover natural gas from a gas well or recover crude oil from a gas-lifted oil well. In other words, the foaming agents of the present invention can remove hydrocarbon and/or water or mixtures thereof from the wells. Exemplary gas-lift methods for producing oil are disclosed in U.S. Pat. No. 5,871,048 and U.S. Patent Application No. 2004-0177968 A1. The foaming agents of the invention are effective at aiding and making more efficient removal of hydrocarbon and/or water or mixtures thereof from wells. It should be appreciated that in some embodiments other corrosion inhibitors, scale inhibitors, and/or biocides may be used in conjunction with or in formulations including the foamers of this invention. Unlike foamers of the prior art, which typically include additional corrosion inhibitors formulated to protect downhole equipment from the corrosive wellbore environment, the foamer of this present invention is also effective for reducing or inhibiting corrosion without the addition of other components. However, if desired additional components, such as those listed above, may be added to the instant composition. The composition may also include one or more suitable solvents including, but not limited to water, ethylene glycol, propylene glycol, glycerol, ethylene glycol monobutyl ether, methanol, isopropanol, the like, derivatives thereof, and combinations thereof.

It should be appreciated that the described compounds may be used alone or in combination with other compounds to further increase the effect and delivery of the products. Typical combinations include pour point depressants and/or surfactants. Examples of suitable pour point depressants are $C_1$ to $C_3$ linear or branched alcohols, ethylene, and propylene glycol. Examples of suitable surfactants are nonionic surfactants, such as alkoxylated alcohols, carboxylic acids or ethers, alkyl ethoxylates, and sorbitan derivatives; anionic surfactants, such as fatty carboxylates, alkyl phosphates, alkyl sulfonates, and alkyl sulfates; cationic surfactants, such as mono- and di-alkyl quaternary amines; amphoteric surfactants, such as alkyl betaines, alkylamido propyl betaines, alklyampho acetates, and alkylamidopropyl hydroxysultaines. Moreover, the described foamers may also be used in conjunction with other foamers, such as those disclosed in U.S. patent application Ser. No. 11/940,777, "Imidazoline-Based Heterocyclic Foamers for Downhole Injection" and any other suitable foamers.

The effective amount of active ingredient in a formulation required to sufficiently foam and/or prevent corrosion varies with the system in which it is used. Methods for monitoring foaming and/or corrosion rates in different systems are well known to those skilled in the art and may be used to decide the effective amount of active ingredient required in a particular situation. The described compounds may be used to impart the property of foaming to a composition for use in an oil or gas field application and may have one or more other functions, such as corrosion inhibition and/or scale inhibition.

Representative commercial formulations include compositions having about 10 weight percent to about 90 weight percent of the described foaming agent. Specific formulations may include about 10, 40, 80, or 90 weight percent of the described foaming agent. It should be appreciated that these are only exemplary formulations and the compositions may include further weight percentages of each foaming agent product and may also include additional components/solvents as described herein.

The imidazoline based compounds of this invention can generate stable foams and are preferably present at a level from about 10 ppm to about 100,000 ppm of actives. A more preferred range is 100 ppm to 20,000 ppm of actives. Most preferably, the range is from 200 ppm to 10,000 ppm of actives. The foregoing levels are based on the total volume of fluid to which the instant composition is introduced. The foamer composition can optionally include a corrosion inhibitor, and a scale inhibitor.

The foregoing may be better understood by reference to the following examples, which are intended for illustrative purposes and are not intended to limit the scope of the invention.

EXAMPLE 1

Preparation of acrylated imidazoline: 282 g (1.0 mol) of a tall oil fatty acid mixture was weighed into a 1 liter round bottom, four-neck flask equipped with an overhead stirrer, thermocouple, addition funnel, and Dean-Stark trap. It was heated to about 70° C. and 128 g (1.24 mol) of diethylenetriamine was added dropwise, with stirring. An exotherm of about 35° C. was observed. The mixture was heated at 130° C. for 1 hour and at 160° C. for an additional 2 hours. The mixture was then heated in the range of 250 to 260° C. for 2 hours with a nitrogen gas sweep. 31 mL (~86% of theoretical) of water was collected. The mixture was cooled and 176.8 g (2.46 mol) of glacial acrylic acid was added dropwise, with stirring, which showed an exotherm of 47 to 67° C. The mixture was heated at 120 to 125° C. for 2 hours to ensure complete reaction. The acrylated imidazoline was diluted with ethylene glycol at 1 to 1 ratio to lower the viscosity. The reaction scheme is shown below, where $R_1CO_2H$ is TOFA and Product 1 is a mixture of the three reaction products.

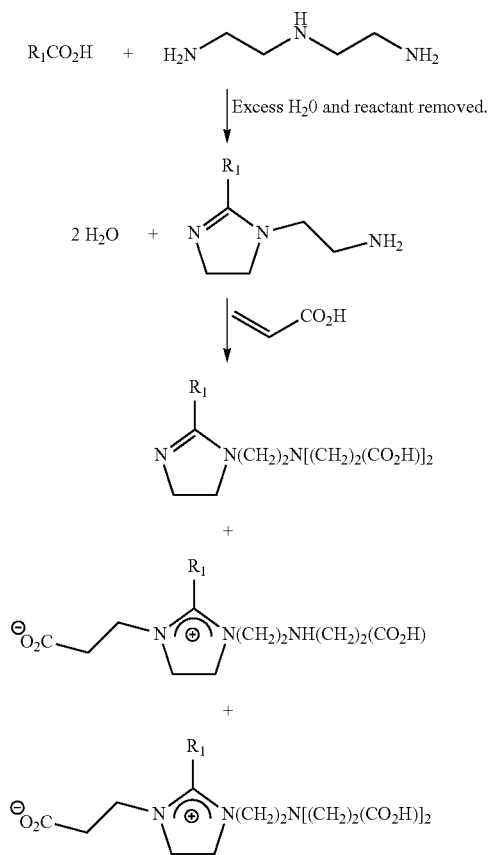

EXAMPLE 2

An alternative reaction scheme is shown below with vinyl sulfonic acid as the acid used in the second reaction step.

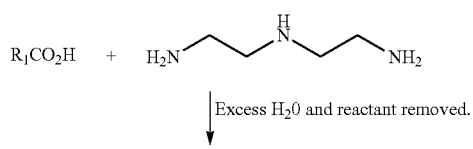

-continued

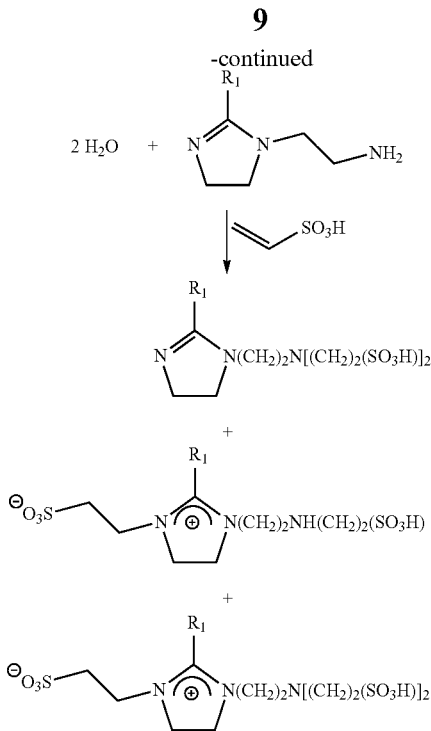

EXAMPLE 3

A foaming agent was added to a hydrocarbon condensate mixture (Exxsol® D40 Fluid available from Exxon Mobil Corporation in Irving, Tex.) and brine (10.2% NaCl and 3.7% $CaCl_2 \cdot 2H_2O$) in the weight-to-weight ratios shown below as C/B (condensate/brine) in Table 1. The conventional foaming agents, olefin sulfonate and cocoamidopropyl betaine were also tested as controls for comparison. The test cell included a nitrogen supply, a jacketed 1,000 ml graduated cylinder with a glass frit on the bottom for gas flow, a flow meter, a temperature-controlled water bath, a container for collecting unloaded liquid, a condenser for transporting the liquid from a cylinder to another container, and a balance connected to a computer for recording real-time measurements. The gas flow rate was held constant at 15 SCFH.

The weight percent liquid unloading was calculated by dividing the weight of the collected liquid in the container at 15 min (i.e., the amount overflowed) by the initial weight placed in the cylinder (100 or 200 grams) times 100. The weight percent of the liquid removed (i.e., percent unloading) was then calculated from 100 grams of fluid. It was observed that Product 1 of the invention was superior to the conventional foamers in all ratios of the condensate tested.

TABLE 1

| C/B (w/w) | Foamer ppm (active) | Olefin Sulf. | C. Betaine | Product 1 |
|---|---|---|---|---|
| 50/50 | 400 | 0 | 0 | 35 |
| 70/30 | 400 | 0 | 0 | 66 |
| 80/20 | 400 | 0 | 0 | 70 |
| 90/10 | 400 | — | — | 76 |
| 97/3 | 400 | — | — | 73 |

EXAMPLE 4

The performance of Product 1 as a corrosion inhibitor was evaluated with a Wheelbox Test and tested against the conventional foamer cocoamidopropyl betaine. This test was conducted at about 350° C. in a rotary oven using flat, rectangular 1018 carbon steel, water quenched, and hardened coupons. To prepare the coupons, metal surfaces were sand blasted, washed in an alcohol/toluene mixture and dried. They were then weighed and placed individually in sample bottles.

The test medium was brine having about 90% seawater. Each bottle was dosed with a measured amount of the foamer and coupons were placed in the bottles, which were then capped and shaken. The bottles were pressurized with $CO_2$ to 200 psi. The oven was loaded with the coupon-containing bottles that were then rotated in the oven for 24 hours at 80° C. After cleaning and drying, the coupons were reweighed and the percent corrosion inhibition was calculated using the formula: $100 \times (W_b - W_t)/W_b$. Where, $W_b$ was the average blank weight loss and $W_t$ was the weight loss of treated coupon.

The results are shown in Table 2. It can be seen that Product 1 of the present invention provided better corrosion protection at low dosage than the conventional foamer.

TABLE 2

| Foamer | ppm, active | % Protection |
|---|---|---|
| Blank | 0 | 0 |
| C. Betaine | 2,000 | 61 |
| Product 1 | 10 | 82 |
| Product 1 | 25 | 93 |
| Product 1 | 50 | 95 |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein and parent or continuation patents or patent applications, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of foaming a fluid and unloading the fluid from an oil or gas well, the method comprising:
   (A) introducing into the fluid at the downhole end of the oil or gas well a foam-forming amount of a composition comprising at least one imidazoline-based compound of the general formula:

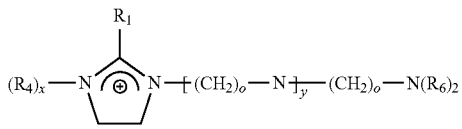

wherein, $R_4$ has the following structure:

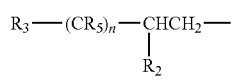

(i) $R_1$ is a moiety selected from the group consisting of: substituted or unsubstituted branched, chain, or ring alkyl or alkenyl having from 5 to about 29 carbon atoms in its main chain; (ii) each $R_2$ is independently hydrogen or a linear alkyl or alkenyl moiety having from 1 to about 10 carbon atoms; (iii) each $R_3$ is independently a moiety selected from the group consisting of: $-CO_2H$, $-SO_3H$, $-PO_3H_2$, $-CO_2R_5$, $-CONH_2$, $-CONHR_5$, $-CON(R_5)_2$, and combinations thereof; (iv) at least one $R_6$ is $R_4$, and the other $R_6$ is H or $R_4$; (v) each $R_5$ is independently a moiety selected from the group consisting of: hydrogen, substituted and unsubstituted linear alkyl, branched alkyl, aryl, alkylaryl, cycloalkyl, and heteroaromatic groups having from 1 to about 10 carbon atoms in the main chain; (vi) n is from 0 to about 8; (vii) each o is independently from 0 to about 10; (viii) x is 0 or 1; and (ix) y is from 0 to about 4
   wherein a method of monitoring foaming rates is used to decide an effective foam-forming amount of the composition to introduce into the fluid;
   (B) forming a foam comprising the fluid and the composition; and
   (C) recovering the foam from the well.

2. The method of claim 1, wherein the imidazoline-based compound is formed from a reaction between at least one long chain fatty acid and at least one polyalkylene polyamine, the reaction producing an intermediate imidazoline, the intermediate imidazoline being further reacted with at least one unsaturated acid or acid derivative to form the imidazoline-based compound.

3. The method of claim 2, wherein the long chain fatty acid is tall oil fatty acid.

4. The method of claim 2, wherein the polyalkylene polyamine is selected from the group consisting of: diethylenetriamine, triethylenetetraamine, tetraethylenepentamine, pentaethylenehexamine, hexaethylenepentamine, and combinations thereof.

5. The method of claim 2, wherein the polyalkylene polyamine has from about 2 to about 16 carbon atoms.

6. The method of claim 2, wherein the unsaturated acid is selected from the group consisting of: acrylic acid, vinylsulfonic acid, 2-methyl vinyl sulfonic acid, maleic acid, and combinations thereof.

7. The method of claim 1, further comprising introducing into the fluid the foam-forming amount of the composition into a downhole end of a well as batch addition or continuously.

8. The method of claim 1, wherein $R_1$ has a substituent selected from the group consisting of: hydrogen, linear or branched alkyl, aryl, alkylaryl, cycloalkyl, and heteroaromatic groups having from 1 to about 10 carbon atoms, and combinations thereof.

9. The method of claim 8, wherein the substituent is oxygenized, sulfurized, phosphorylized, or combinations thereof.

10. The method of claim 1, wherein the composition further comprises a solvent selected from the group consisting of: organic solvent; water; xylene; alcohols including at least methanol, ethanol, isopropanol, isobutanol, and secondary butanol; glycols including at least ethylene glycol, propylene glycol, and ethylene glycol monobutyl ether; glycol ethers; glycerol; aliphatic hydrocarbons; aromatic hydrocarbons including at least naptha; and combinations thereof.

11. The method of claim 1, wherein the foam-forming amount of the composition has from about 10 to about 90 weight percent of the imidazoline-based compound.

12. The method of claim 1, further comprising introducing the composition to the fluid so that from about 10 to about 100,000 ppm of the imidazoline-based compound is present in the fluid.

13. The method of claim 1, further comprising introducing the composition to the fluid so that from about 100 to about 20,000 ppm of the imidazoline-based compound is present in the fluid.

14. The method of claim 1, further comprising introducing the composition to the fluid so that from about 200 to about 10,000 ppm of the imidazoline-based compound is present in the fluid.

15. The method of claim 1, wherein the fluid is oil or gas and water.

* * * * *